Jan. 25, 1966

A. D. BENNETT ETAL 3,231,895

MAGNETIC DATA RECORDING

Filed Feb. 18, 1960

3 Sheets-Sheet 1

ARTHUR D. BENNETT
JOSEPH D. EISLER
INVENTOR.

BY Newell Pottorf
ATTORNEY

ARTHUR D. BENNETT

JOSEPH D. EISLER

INVENTOR.

BY Newell Pottorf

ATTORNEY

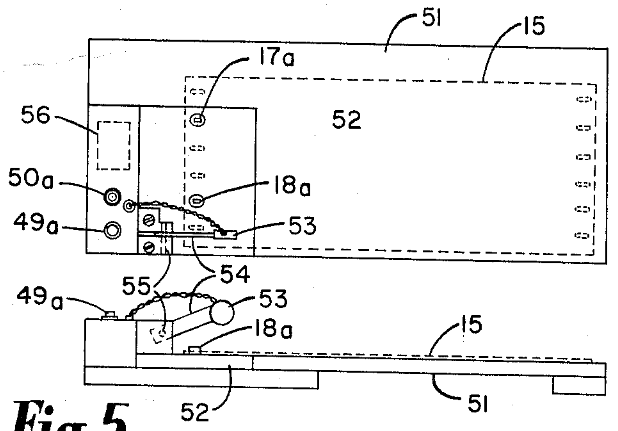
Fig. 4
Fig. 5.
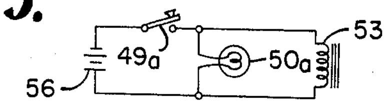
Fig. 6.
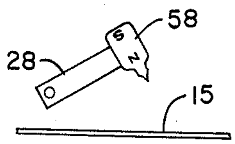
Fig. 7.
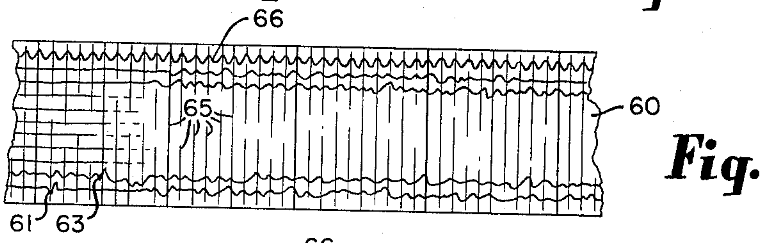
Fig. 8.
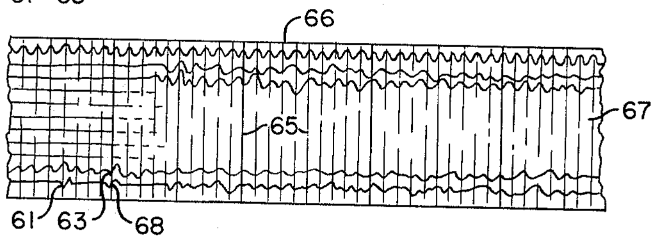
Fig. 9.
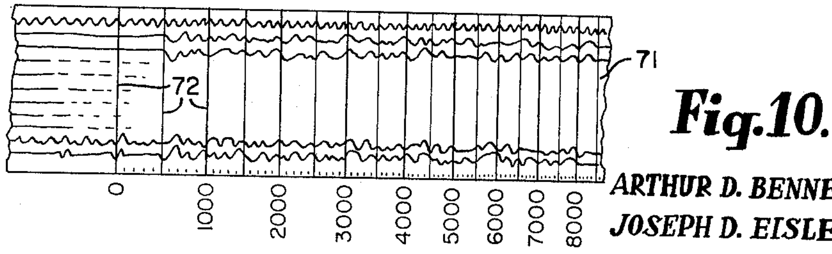
Fig. 10.
ARTHUR D. BENNETT
JOSEPH D. EISLER
INVENTOR.
BY Newell Pottorf
ATTORNEY 3,231,895
Patented Jan. 25, 1966

3,231,895

MAGNETIC DATA RECORDING

Arthur D. Bennett and Joseph D. Eisler, Tulsa, Okla., assignors to Pan American Petroleum Corporation, Tulsa, Okla., a corporation of Delaware Filed Feb. 18, 1960, Ser. No. 9,505
2 Claims. (Cl. 346—1)

This invention relates to magnetic data recording and is directed to the magnetic multiple-trace recording of data such as are obtained in seismic geophysical surveying. More specifically, the invention is directed to a method and apparatus for inscribing and utilizing magnetic reference or scale marks on records of multiple-trace magnetically recorded data.

Multiple-trace magnetic recording and playback equipment has recently come into general and wide use for recording the data obtained in seismic geophysical surveying. Besides the traces of field data from various seismometer groups, the recordings made in field operations normally also include auxiliary information traces showing, for example, the passing of time in suitable units such as hundredths of a second, the time break corresponding to zero time when seismic waves are initiated, and the response of a seismometer close to the initiation point.

In playing back the field magnetic records for interpretation, for assembly into cross sections and the like, various corrections such as for normal move-out and for changes in weathering and elevation are normally made by the playback equipment. It is preferred to utilize the time break as a zero reference point for initiating the automatic operation of this equipment; but this is at times difficult to do, especially if the time break is not free from noise. This is especially true when the time-break signal has been transmitted by a radio link between the shooting and recording points, when it may be accompanied by substantial amounts of static or electrical noise interference.

Visual recognition of the time break in the presence of such noise is usually not difficult because of its characteristic pulse form. The use of a noisy time break to trigger the automatic correction mechanisms of the playback machine, however, is a different matter, since the noise rather than the time break may do the triggering. A further problem in the use of magnetic records arises during their alignment with other records in making cross-section displays. All of the records of a display will ordinarily be oriented or adjusted to a common reference or datum plane. Zero time or some other reference point on the various records, however, generally occurs at different distances from the starting ends of different records, and this complicates their mutual alignment.

It is often also desirable to be able to include in the final recorded presentation various reference marks or indications of units of depth in accordance with an assumed or measured relation between record time and depth below the ground surface, or relative to some other reference level. It is ordinarily not practical to record these depth-reference marks at the same time as the original data because their positions on the record are dependent upon some of the corrections which must be applied to the raw field data.

It is accordingly a primary object of the present invention to provide a method and apparatus for magnetically inscribing multiple-trace magnetic records and for utilizing such records for overcoming the effects of noisy time breaks, for datum-plane alignment, and/or to furnish accurately placed depth-reference or other markings. A more specific object is to provide a method and apparatus for accurately inscribing fiducial or reference marks on a multi-trace magnetic record and for using such marks to aid in record alignment or to locate on said record other signal-producing marks useful in correcting, analyzing, and presenting the data for visual interpretation. Other and further objects, uses, and advantages of the invention will become apparent as the description proceeds.

Briefly stated, the foregoing and other objects are accomplished by placing upon a magnetic-recording sheet or tape, at a location not used for data and other recording purposes, and preferably before the first playback of the data, a magnetic fiducial or reference pulse or mark which is accurately located at a known position with respect to the record-orienting and holding perforations. The exact time interval from said fiducial mark to any other point or event on the final record, such as a time break which is partially obscured by noise, can then be read off the first playback record, using the time trace or lines which are recorded during the original recording.

When this time interval has been ascertained, the magnetic record is then aligned, using its registering perforations, with a time-marked scale whose zero coincides with the position of the fiducial mark and whose length intervals exactly equal the distance between corresponding times along the magnetic record. A magnetic-marking head movable along the scale is positioned in accordance with the scale markings at any place a magnetic mark is desired with respect to the fiducial mark. For example, the exact time interval between the fiducial mark and the noisy time break is read off the first playback. The magnetic record is then aligned with the scale, and the movable head is placed at the scale position equal to the exact time interval read off the first playback record and in a space where no data will be obscured. Suitable actuation of the marking head then causes it to place a sharp magnetic mark on the magnetic record at the exact time of the noisy time break. This mark is then available for use as a clear triggering pulse for the triggering of the automatic correction mechanism, without any possible false triggering due to noise.

Of course, if desired or preferred for any reason, the triggering mark could be placed at any position on the record other than coincident with the time break in the same manner as stated above. Besides its use for triggering, the accurately placed mark can be used as an alignment indicator by direct comparison with a reference pulse on another record or a display thereof. Or the fiducial mark itself may be used to aid the alignment of records for assembly in a cross section simply by ascertaining the time interval between it and the datum plane for each of a plurality of records, and relatively shifting parts of the playback and display equipment to exactly compensate for the variations in this time interval.

Likewise, a series of marks at various record times which may be subsequently determined, such as depth reference marks according to any assumed or measured relation between record time and depth in the earth's subsurface, can be placed on the record by moving the marking head to each of a plurality of corresponding scale positions in sequence, and actuating the head to produce a magnetic pulse at each position.

This will be better understood by reference to the accompanying drawings forming a part of this application and illustrating a typical embodiment of the invention, as well as certain ways in which it may be used. In these drawings, FIGURE 1 is a perspective view of the magnetic mark-inscribing device of the invention;

FIGURE 4 is a plan view of an auxiliary apparatus;

FIGURE 5 is an elevation view of the device of FIGURE 4;

FIGURE 6 is a wiring diagram of the device of the invention;

FIGURE 7 is an elevation view of an alternate form of mark-producing head;

FIGURE 8 is a diagrammatic illustration of a portion of a typical field playback record;

FIGURE 9 is a diagrammatic illustration of a recording similar to that of FIGURE 8 after application of the invention thereto; and FIGURE 10 is a diagrammatic illustration of a record to which depth markings have been applied by use of the invention.

Figure 1:
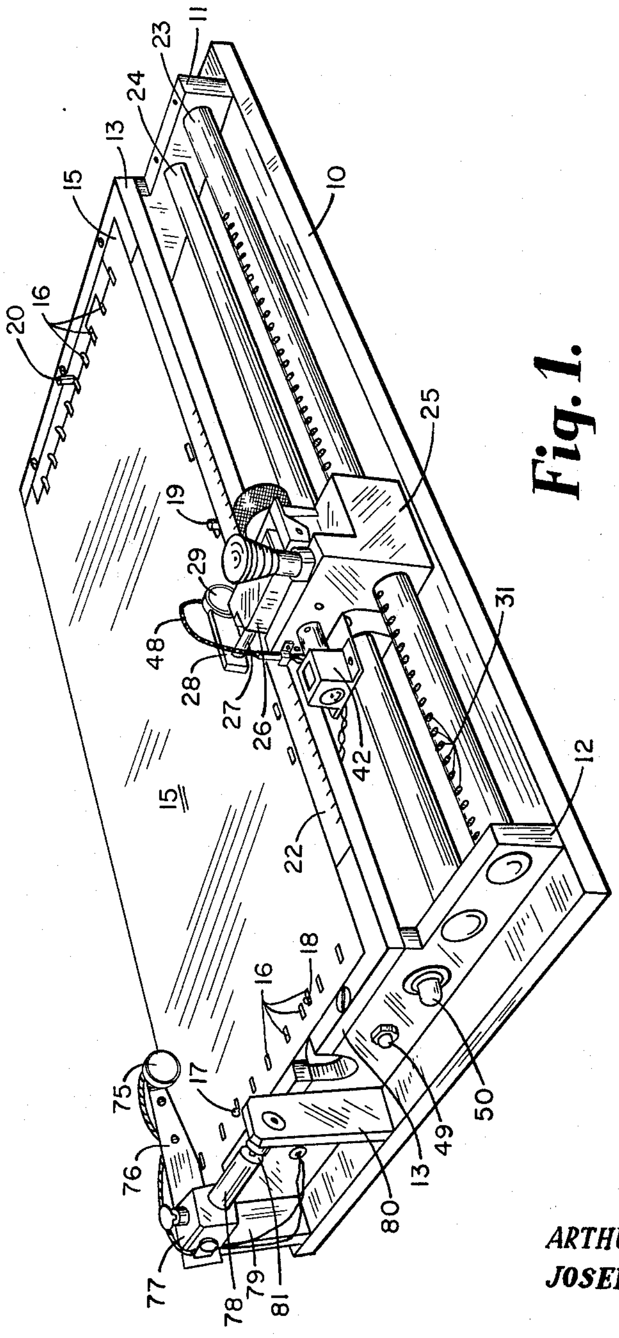
Figure 2:
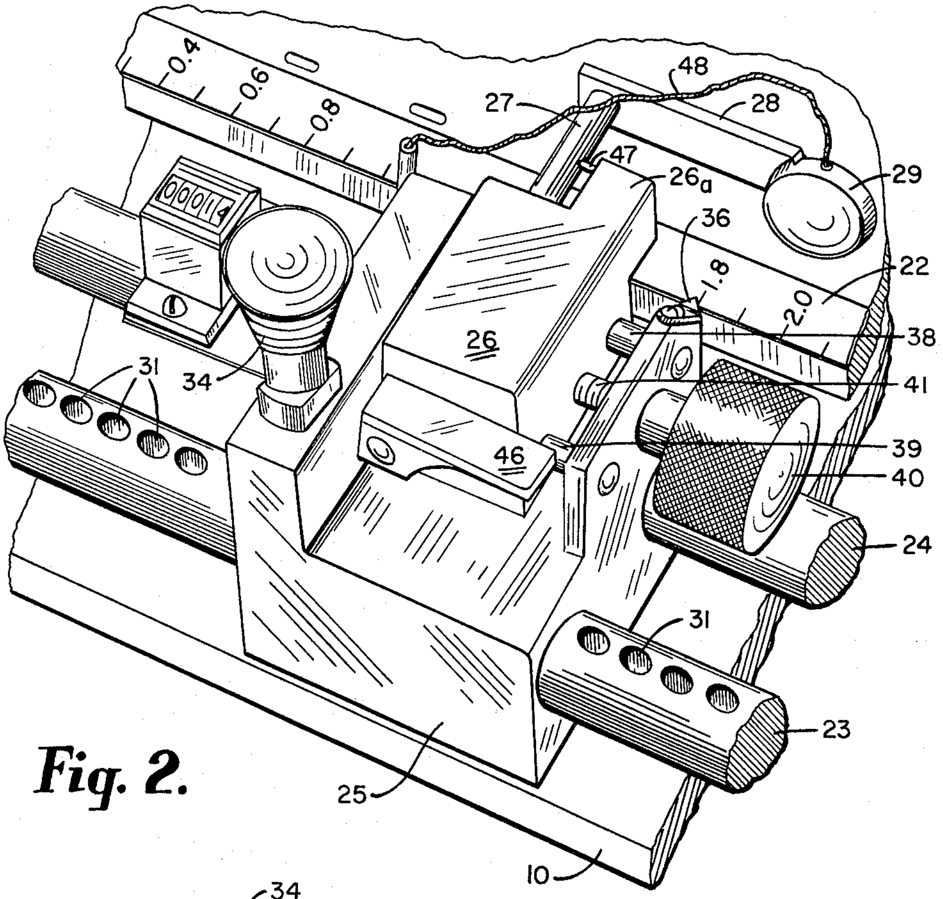
FIGURE 2 is an enlarged detail view of a portion of the device of FIGURE 1.
Figure 3:
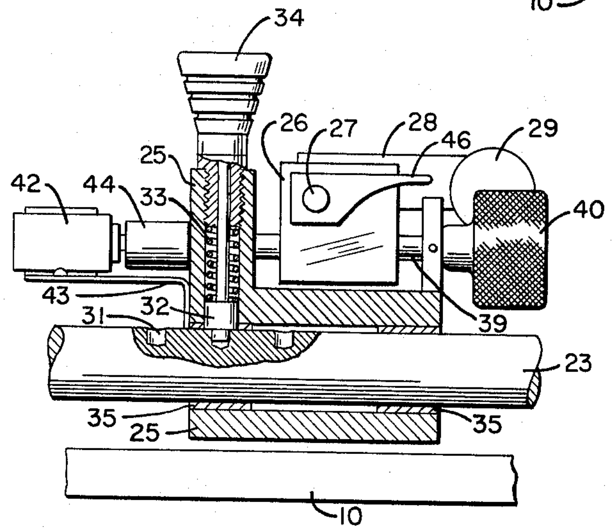
FIGURE 3 is an elevation view, with certain parts in cross section, of the device of FIGURE 2.

Referring now to the drawings in detail and particularly to FIGURES 1, 2, and 3 thereof, these figures show a magnetic sheet or tape-marking device which embodies our invention. To a rectangular base 10 are attached a pair of spaced support members 11 and 12 which support a tape-holding table 13. Shown on the table 13 in FIGURE 1 is a rectangularly shaped tape 15 having at each end perforations 16 by which it is adapted to be held on the outer surface of a cylindrical drum (not shown) forming part of a conventional multiple-trace data recorder such as is used in seismic geophysical surveying. The tape 15 is held on table 13 by a plurality of perforation-engaging pins including fixed register pins 17 and 18 at the starting end of the tape, a guide pin 19 engaging a perforation close to one edge of the tape, and a pivoted tension pin 20 at the other end of table 13 from fixed pins 17 and 18. A biasing spring (not shown) acting on tension pin 20 causes the tape 15 to be stretched between it and the fixed pins 17 and 18, thereby holding the tape 15 flat on table 13 with a tension similar to that applied to it on the recorder drum.

Extending along the edge of the table 13 adjacent and parallel to the edge of the tape 15 is a marked scale 22 calibrated in units of recording time along the length of tape 15. Preferably, the spacing between the marks of scale 22 is exactly equal to the distance of movement of the tape 15 in a given unit of recording time. In the case of seismic data recording, this unit is preferably 100 milliseconds, for example. Held at their ends by the supports 11 and 12, are a pair of guide tracks or rods 23 and 24, which are accurately parallel to each other and to the edge of the tape 15 and the scale 22. Slidable along the tracks 23 and 24 is a main or index carriage 25 carrying a vernier or head carriage 26 from which projects a shaft 27. Attached to the end of and rotatable by shaft 27 is an arm 28 having at its free end a magnetic mark-recording head 29 which, in the illustrated position of the arm 28, contacts the surface of the tape 15 at a given distance from its edge.

One of the guide tracks, such as the track 23, is provided with shallow holes 31 precisely equally spaced from each other at the exact distance of the spacing of markings on the scale 22. As is best shown in FIGURE 3, a vertical bore in the carriage 25 contains an accurately fitting plunger 32 having a tip which closely fits the holes 31. A compression spring 33 urges the plunger 32 downwardly, while a handle 34 for lifting it projects above the carriage 25.

The horizontal bores of the carriage 25, through which pass the tracks 23 and 24, are preferably fitted with low-friction bearing sleeves 35 which fit the tracks 23 and 24 closely but allow free movement of the carriage 25 along the tracks. Thus, with plunger 32 raised and held up by the handle 34, the carriage 25 can be easily and quickly shifted along the tracks 23 and 24 and stopped accurately at any 100-millisecond mark of the scale 22 by engaging the plunger tip in a corresponding one of the holes 31. An index pointer 36 on the carriage 25 projecting toward the scale 22 indicates, by reference to the numerical markings of seconds and tenths of seconds on the scale, which tenth-second position is occupied by the carriage 25.

For precisely positioning the head 29 along the record 15 at any point between the marked scale positions of scale 22, the vernier or head carriage 26 is movable with respect to the carriage 25 along a pair of parallel tracks 38 and 39 mounted on the carriage 25. Movement of the carriage 26 is effected by rotating the knob 40 of a lead screw 41 which engages threads within the body of carriage 26. By proper choice of the thread pitch for screw 41, the dial of a counter 42, mounted on a bracket 43 attached to the main carriage 25 and connected by a coupling collar 44 to the screw 41, reads directly in milliseconds. For example, in one model of this device, a pitch of 28 threads per inch was effective to produce direct reading of milliseconds by the counter 42.

In order to avoid any accidental marking or other undesirable effect of having head 29 continually in contact with tape 15, the shaft 27 is movable lengthwise in addition to being rotatable in head 26 by means of a lever or handle 46. A spring (not shown) within a recess inside of head carriage 26 presses against handle 46 to move shaft 27 lengthwise in the same way as spring 33 acts on the plunger 32. Projecting from the side of shaft 27 is a pin 47 which rests against the end face of an extension **26*a* of the head carriage 26 when the head 29 is down in marking position against tape 15. By rotating shaft 27 counterclockwise with handle 46, pin 47 disengages from the face of extension 26*a*, shaft 27 is retracted by the spring, and the pin 47 then holds the head 29 suspended in the air by resting against the side of extension 26*a***.

The winding (not shown) of head 29 is connected by a pair of flexible leads 48 to a battery (not shown) in series with a push-button switch 49. Electrically connected in parallel with head 29 is an indicating light 50 which shows the application of voltage to head 29, as well as indicating the general condition of the battery.

In FIGURES 4 and 5 is shown an auxiliary device for use with this invention in certain cases. This device is basically a table 51 on which is mounted a plate 52 holding in fixed relation a pair of perforation-engaging register pins **17*a* and 18*a* and a magnetic marking head 53 mounted on an arm 54 pivoted at pivot 55 but otherwise not movable relative to the register pins. In use, the tape 15 is placed on register pins 17*a* and 18*a* utilizing its perforations in the same way as when it is placed on pins 17 and 18 of table 13, except that an additional pin corresponding to tension pin 20 is not here required. Head 53 is lowered onto tape 15, and the push-button switch 49*a* is then pressed to send a mark-producing impulse of electric current through the head 53 and through the light 50*a***.

The wiring diagram of FIGURE 6 shows the interconnection of battery 56, switch **49*a*, light 50*a*, and marking head 53. The same wiring diagram is applicable also to the device of FIGURE 1 with heads 29 and 75 substituted for head 53**.

In FIGURE 7 is shown an alternative form of mark-producing head to the head 29 (or 53). In place of head 29 the arm 28 carries a small permanent magnet 58 polarized lengthwise, with the end adapted to contact record 15 being formed into a chisel-shaped point. When magnet 58 is held away from tape 15, no marking of the tape occurs. When the point is placed in contact with tape 15 and then withdrawn, however, a strongly magnetized spot or point remains as a mark on the tape, which upon scanning by a playback head produces a sharp pulse similar to that made by the electric current-energized head 29 or 53.

One way in which the apparatus of the invention is used in the playback of magnetically recorded seismic data is illustrated in FIGURES 8 and 9. The playback record 60 of FIGURE 8 represents diagrammatically a field playback record of conventional form. Such a record shows the field data just as they are recorded originally on the tape 15 without corrections of any kind for weathering, elevation, or moveout. Record 60 is preferably in the form of oscillographic traces such as are produced on photosensitive paper by galvanometer-deflected light beams. Some such visible record is necessary for study because the magnetic tracks are by themselves completely invisible on the record 15.

At any time prior to the playback of tape 15 to produce record 60, and preferably before the tape is used in making the field recording, it is marked by the device of FIGURE 4. To do this the perforations at the starting end of tape 15 are placed on the register pins 17*a* and 18*a*, head 53 is lowered into contact with the tape surface, and switch button 49*a* is pressed to energize the head and make the reference or fiducial mark. The tape is then used for field recording in the normal way, it being understood that the mark is so located as not to be erased during recording or in any other handling of the tape. Then, upon playback, the record 60 of FIGURE 8 is obtained showing at 61 the mark impressed by the head 53, as well as the seismic and auxiliary data normally recorded. The time break corresponding to the instant of initiation of the seismic waves appears at 63. However, as is often true when this time break is transmitted by radio rather than by a direct-wire connection, it is accompanied by a substantial amount of electrical noise which is also recorded. Thus, the time break trace in the form shown is not suitable for automatically triggering or synchronizing the playback moveout-correction mechanism, as the triggering will very often be done by the noise rather than the true time break.

As the record 60, however, normally also includes conventional timing lines 65 produced by playback of the timing trace 66, the exact time interval between fiducial mark 61 and the noisy time break 63 can be ascertained to the nearest millisecond by reference to these timing lines.

The relationships between register pins 17*a*, 18*a*, marker head 53, register pins 17 and 18, and the scale 22 are such that, with the main carriage 25 and the counter 42 set at zero, the playback of a mark placed by the head 29 occurs at exactly the same time as it does for mark 61 placed by head 53. In other words, mark 61 is at the zero scale position. Therefore, having determined from record 60 the precise time interval between mark 61 and time break 63, carriages 25 and 26 are set to this exact reading on scale 22 and counter 42, head 29 is lowered onto record 15, and switch 49 is momentarily closed to produce a magnetic mark. This mark coincides exactly in time with the time break 63 but is located at a clear and noise-free position on tape 15.

Record 67 of FIGURE 9 is an oscillographic playback record of tape 15 after it has been so marked. The pulse 68 which has been added to this record exactly coincides in time with time break 63 but is completely free of the accompanying noise and may, therefore, be used to trigger the playback correction mechanism without false triggering or ambiguities such as the noise accompanying time break 63 might cause. Although trigger pulse 68 is here shown on the same track as the fiducial or reference pulse 61, it can be placed on any other trace desired simply by making shaft 27 of the right length. Likewise, making the triggering pulse 68 coincide with the time break 63 is only by way of example, as it can be placed at any other time earlier or later than the time break by a correspondingly different setting along scale 22 and counter 42, if it is desired to trigger the correction mechanism earlier or later than the time break 63.

For example, it can be placed at the location of a datum or reference plane on record 67, determined by computation, which plane is also computed for a number of other records to be displayed in alignment with record 67. The interval between the fiducial and the datum-plane pulses of the several records can be used in making the alignment, and the accuracy with which the alignment is achieved is shown by the coincidence of the datum plane pulses in the final display.

A still further use of trigger pulse 68 is shown by the record 67 in that the pulse can be used to start the electrical counting circuits which produce emphasis of certain of timing lines 65 by making each fifth and tenth line appear heavier than the intermediate lines. As shown, a heavy tenth-second line can be made to coincide with the time break 63.

Another manner of using the apparatus of this invention is illustrated in FIGURE 10. Since the apparatus is completely flexible as to the number and location of marks which can be inscribed along the edge of a record, depth-scale markings can be applied by it to a corrected record 71, either in addition to or in place of the timing lines 65.

The device of FIGURE 1 is preferably first used to prepare a "depth" tape. From a time-depth chart or curve, derived from a well log of velocity or travel time as a function of depth below the ground surface, either as measured or as assumed, the time to each unit of depth is ascertained. For example, the sub-weathering travel times of seismic waves to and from depths of 1,000 feet, 2,000 feet, 3,000 feet, and so on, are respectively ascertained from the chart or curve. Preferably also, travel times to and from intermediate depths between the main depth intervals, such as for each successive 100-foot depth, may be determined. Then, by using the scale 22 and counter 42 to move the marking head 29 to each time point in succession, a mark corresponding to each desired division point of a depth scale can be inscribed on a blank piece of recording tape.

The depth-display record 71 is then produced in two steps. First the corrected traces, for example, as shown on the record 67, are reproduced either with the timing lines 65 present as in FIGURE 9, or with the timing lines omitted, as may be desired. In the record of FIGURE 10, it is assumed that such lines have been omitted. Then the depth tape, produced as described above, is placed upon the drum of the playback mechanism, and any necessary shift of the drum is made as required to cause the zero-depth line to fall on the time break of the record 71, or at any other desired position or zero-reference datum with respect to the time break. Then, the depth tape is played back by triggering the timing-line flasher or flash tube, which photographically exposes the lines 65, with the marks inscribed on the depth tape so as to produce the depth-scale lines 72 shown in FIGURE 10. In this figure only the emphasized lines have been shown, as the intermediate scale markings tend to become quite crowded at large depths.

While, as described, this is a two-step process involving playback from two tapes, it will be understood that the same depth-unit marks or any chosen ones of them can equally well be placed upon the field tape 15 in an unused trace position, so as to be played back at one pass through the playback apparatus at the same time as the reproduction and correction of the data traces take place.

Referring again to FIGURE 1, at the starting end of tape 15 but close to the opposite edge of the table 13 from the head 29 and its associated apparatus is an additional mark-producing head 75 mounted on the end of an arm 76 attached to a pivot block 77 slidable between two positions on a shaft 78 supported by vertical supports 79 and 80 attached to base 10. The purpose of the head 75 is to produce a reference or fiducial mark at the same time as the mark produced by the head 53 but on other edge of the tape. This mark is not of direct use in the present invention but is principally for use in connection with the particular playback apparatus that is normally employed. It provides the same kind of reference mark as is used in the present invention but allows the detecting of this mark with different magnetic playback heads from those employed in the present case. The pivot block 77 is movable between the position shown and the notch 81 along shaft 78 in order to accommodate two different widths of the recording tape 15. The energizing coil of head 75 is normally electrically connected in parallel with that of head 29 for marking purposes.

The fiducial mark 61 shown on the field playback record 60 can instead, or in addition, be shown on the field monitor record, which is a visible-trace record made simultaneously with the recording of the data traces on tape 15. To do this it is necessary only to provide a playback head to scan the previously inscribed fiducial-mark trace and furnish a signal pulse therefrom to a recording galvanometer during the time that the data are being recorded on tape 15 by the magnetic recording heads and on the monitor record by recording galvanometers.

While our invention has been described with reference to the foregoing details and embodiments, it is to be understood that other and further modifications will be apparent to those skilled in the art. The scope of the invention, therefore, should not be considered as limited to the details described, but it is properly to be ascertained from the appended claims.

We claim:

1. The method of placing a magnetic triggering mark at a desired time on a perforated simultaneously recorded multiple-trace magnetic data record having orienting and holding perforations, which method comprises inscribing on said record a magnetic fiducial mark at a known data-free location relative to said orienting perforations, recording on said record a plurality of data traces including a timing trace indicative of the passing of time and a pulse indicative of a zero-reference time for said data, making a visible-trace playback of said record including said fiducial mark, said timing trace, and said pulse, determining from said visible-trace playback with reference to said timing trace the time interval between said fiducial mark and said pulse, aligning said record by said orienting perforations along a scale extending parallel to said traces and calibrated in recording-time units, moving a mark-placing head along said scale to a position indicated by said scale as the sum of said time interval and said desired time, and actuating said head to cause it to place said triggering mark on said record.

2. The method of inscribing depth-index marks on a magnetic record adapted for actuating seismic magnetic playback equipment to place depth-scale marks on a visible-trace record display comprising, inscribing a magnetic fiducial mark on said record, aligning said record by its orienting perforations alongside a time scale extending parallel to the magnetic traces of said record and calibrated in recording-time units and having its zero-time position coincident with said fiducial mark, moving a mark-producing head along said time scale to a point desired for placement of a zero-depth mark, determining the time interval between said fiducial mark and said zero-depth mark, moving said head to each of a succession of points on said time scale which is the sum of said interval and the two-way seismic-wave travel time to each of a corresponding succession of depth-scale division points, in accordance with a given relationship between two-way seismic-wave travel time and depth, and actuating said head at each of said points to inscribe a corresponding depth-scale division magnetic mark.

References Cited by the Examiner

UNITED STATES PATENTS

| | | | |
|---|---|---|---|
| 2,714,010 | 7/1955 | Gruber et al. | 179—100.2 |
| 2,744,755 | 5/1956 | Dibbins | 179—100.1 |
| 2,923,589 | 2/1960 | Curtis | 346—74 |
| 2,941,184 | 6/1960 | Moody | 340—15.5 |
| 2,975,017 | 3/1961 | Conkey et al. | 346—74 |
| 2,989,726 | 6/1961 | Crawford et al. | 340—15.5 |
| 3,004,112 | 10/1961 | Goldsmith | 179—100.2 |

LEYLAND M. MARTIN, *Primary Examiner.*

R. H. ROSE, ROBERT SEGAL, *Examiners.*